Patented Aug. 24, 1954

2,687,356

UNITED STATES PATENT OFFICE 2,687,356

METHOD OF CURING AND PROCESSING FISH

Pasquale Fraticelli, Boston, Mass., assignor to Sealady Seafood Corp., Boston, Mass., a corporation of Massachusetts No Drawing. Application August 4, 1948,
Serial No. 42,532

3 Claims. (Cl. 99—111)

This invention relates to an improved process for the curing of fish.

A further object of this invention is the provision of a process for the curing of tuna-like fish so as to give the fish flesh an appearance and a flavor quite similar to that of cured sausage, pork or beef meat.

I have found that it is possible to take tuna-like fish, such as bonito and yellow tail, and tuna, and subject it to a curing process which will give to the cured fish a meat-like appearance. That is true because tuna-like fish has an abundance of blood and because the fiber or grain of tuna and tuna-like fish will enable ready binding.

Referring to the process of preparing the fish to be cured, tuna or any tuna-like fish is first butchered. Assuming that the butchered fish flesh totals one hundred pounds, the same is comminuted as by grinding or chopping and curing ingredients are mixed therewith in substantially the following proportions:

Sodium nitrite _____ A trace to 1 oz.
Sodium or potassium nitrate ___ ½ oz. to 4 oz.
 (Either or both may be used.)
Sodium chloride _____ ½ lb. to 2½ lbs.
 (To suit taste.)
Glutamic acid _____ 1 oz. to 6½ oz.
 (This ingredient is not absolutely essential and preferably it is monosodium glutamate.)

While variations in the ranges of the above ingredients may be used and the ingredients can be selectively used to suit, the preferred ingredients and the optimum proportions are as follows:

Sodium nitrite _____ ¼ oz.
Sodium and/or potassium nitrate ___ 2 oz. (total)
Sodium chloride _____ 1¼ lb.
Glutamic acid _____ 4 oz.

The steps of curing the fish may be conventional subsequent to the above, so far as temperature and time treatment are concerned. This may vary, depending upon whether the cured fish is to be utilized in the making of sausages, frankfurters, loaf meats, bologna or in other form.

Assuming that the cured fish, as above provided, is to be used in the manufacture of sausages or frankfurters, seasoning and flavoring is accomplished thru the use of natural and artificial spices. Assuming that one hundred pounds of tuna or tuna-like fish have been mixed with the curing ingredients above mentioned, seasoning and artificial spicing is preferably taken care of thru mixture with the following ingredients and their respective proportions:

Mace _____ ½ to 4 oz.
White pepper _____ 4 oz. to 6 oz.
Monosodium glutamate _____ ½ to 4 oz.
Ginger _____ ½ to 4 oz.
Coriander _____ ½ to 4 oz.

The optimum percentages of the flavoring and seasoning ingredients for one hundred pounds of tuna or tuna-like ground or chopped fish for the preparation of sausages or frankfurters is as follows:

Ounces
Mace _____ 1
White pepper _____ 4
Monosodium glutamate _____ 2
Ginger _____ 2
Coriander _____ 2

In the processing of the cured fish where the same is to be used in skins for production of sausages or frankfurters, after flavoring, etc. as above mentioned, ice or water may be added in suitable quantities for processing. The above amount of cured fish may have added thereto three ounces of dry milk solids; 2½ lbs. binding flour which may be soy bean flour or wheat flour, and 10% to 15% by weight of vegetable shortening such as hydrogenated vegetable oil and/or fat of the pork or beef variety.

The curing is completed when the fish food, as above provided, is boiled or smoked in a step succeeding the addition of the curing and seasoning ingredients, and as above stated, the time of treatment and temperature depends upon the type of fish food desired to be provided.

After the fish food has been placed in skins or artificial casings, assuming that the same is to be smoked, the processing for smoking is carried out over a period of two and one-half hours. For the first hour the smoking takes place at 150° F. and then for the next one and one-half hours the heat is gradually raised to 160° F.

If the fish food as above provided is to be boiled or cooked, such takes place at a temperature of 185° F. in a pressure cooker or otherwise until the inside temperature of the fish food reaches 150° F.

Any processing steps which are conventional in the curing of meats, other than the above, may be used for the preparation of the fish food; the most important part of the above processing being the addition of the particular curing ingredients in the curing of tuna or tuna-like fish flesh; the steps of treatment under time or temperature conditions being left to the discretion of the producer for the preparation of the type of food to be provided.

After curing and processing, as above mentioned, the finished fish food product has an appearance resembling that of cured beef or pork and the taste is quite similar to that of cured animal flesh.

Various changes in the processing steps and in the ingredients and proportions used may be used to the above without departing from the spirit of the invention or the scope of the claims.

I claim:

1. The process of preparing a fish food which consists in taking bloody fleshed fish of the tuna variety, cleaning and comminuting the same, adding preserving and curing ingredients thereto and subsequently processing and curing the same.

2. The process of preparing a wholly fish flesh food from a fish of the group consisting of tuna, bonito and yellow-tail, which consists in butchering the fish to provide fish flesh, comminuting the butchered fish flesh, curing and seasoning the comminuted fish flesh, compacting the cured and seasoned fish flesh into sausage form, and smoking the compacted fish flesh.

3. The process of preparing a fish flesh food in sausage form which consists of comminuting exceptionally bloody fish selected from a group consisting of tuna, bonito and yellow-tail, adding curing ingredients to the comminuted fish flesh, seasoning and flavoring the comminuted fish flesh, boiling the fish flesh, shaping the flesh into sausage form, and subsequently smoking the flesh in sausage form.

References Cited in the file of this patent

UNITED STATES PATENTS

| Number | Name | Date |
|---|---|---|
| 69,769 | Chevalier | Oct. 15, 1867 |
| 97,145 | Adams | Nov. 23, 1869 |
| 974,660 | Hahn | Nov. 1, 1910 |
| 1,259,376 | Doran | Mar. 12, 1918 |
| 1,635,302 | Alsberg | July 12, 1927 |
| 2,054,626 | Griffith | Sept. 15, 1936 |
| 2,173,992 | Allen | Sept. 26, 1939 |
| 2,176,036 | Musher | Oct. 10, 1939 |

FOREIGN PATENTS

| Number | Country | Date |
|---|---|---|
| 16,601 of 1908 | Great Britain | Dec. 17, 1908 |
| 15,763/33 | Australia | Jan. 2, 1935 |

OTHER REFERENCES

"Manufacture of Frankfurters," 1935, by Dr. C. Robert Moulton, pages 4 to 7, published by Meat Magazine, Chicago, Illinois.